July 9, 1957  W. L. BENNINGHOFF ET AL  2,798,234
FLOATING CHUCK
Filed Jan. 3, 1955  3 Sheets-Sheet 1
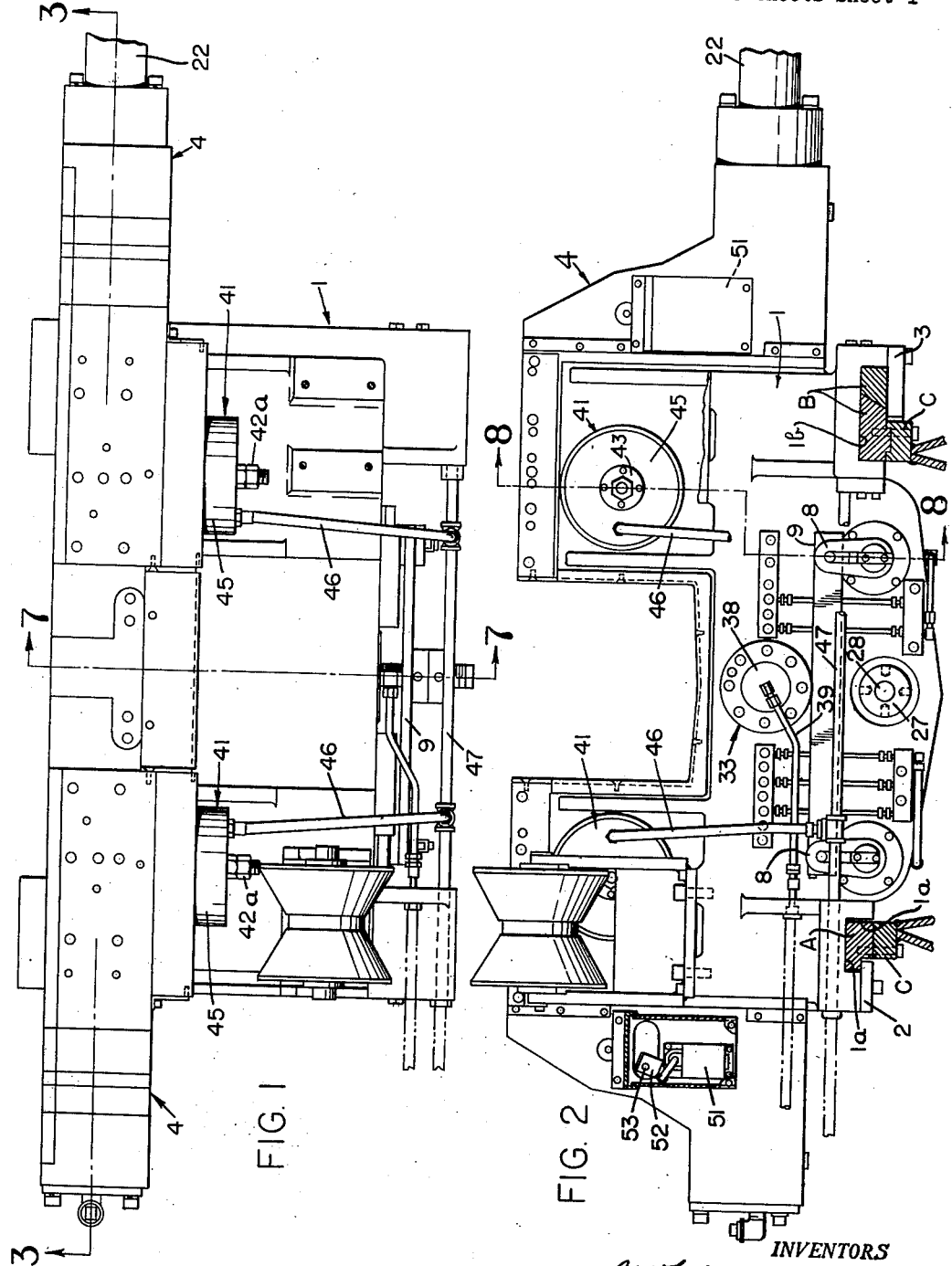
INVENTORS
W. L. Benninghoff
BY N. T. Sawdey
Gehr and Leonard
ATTORNEYS

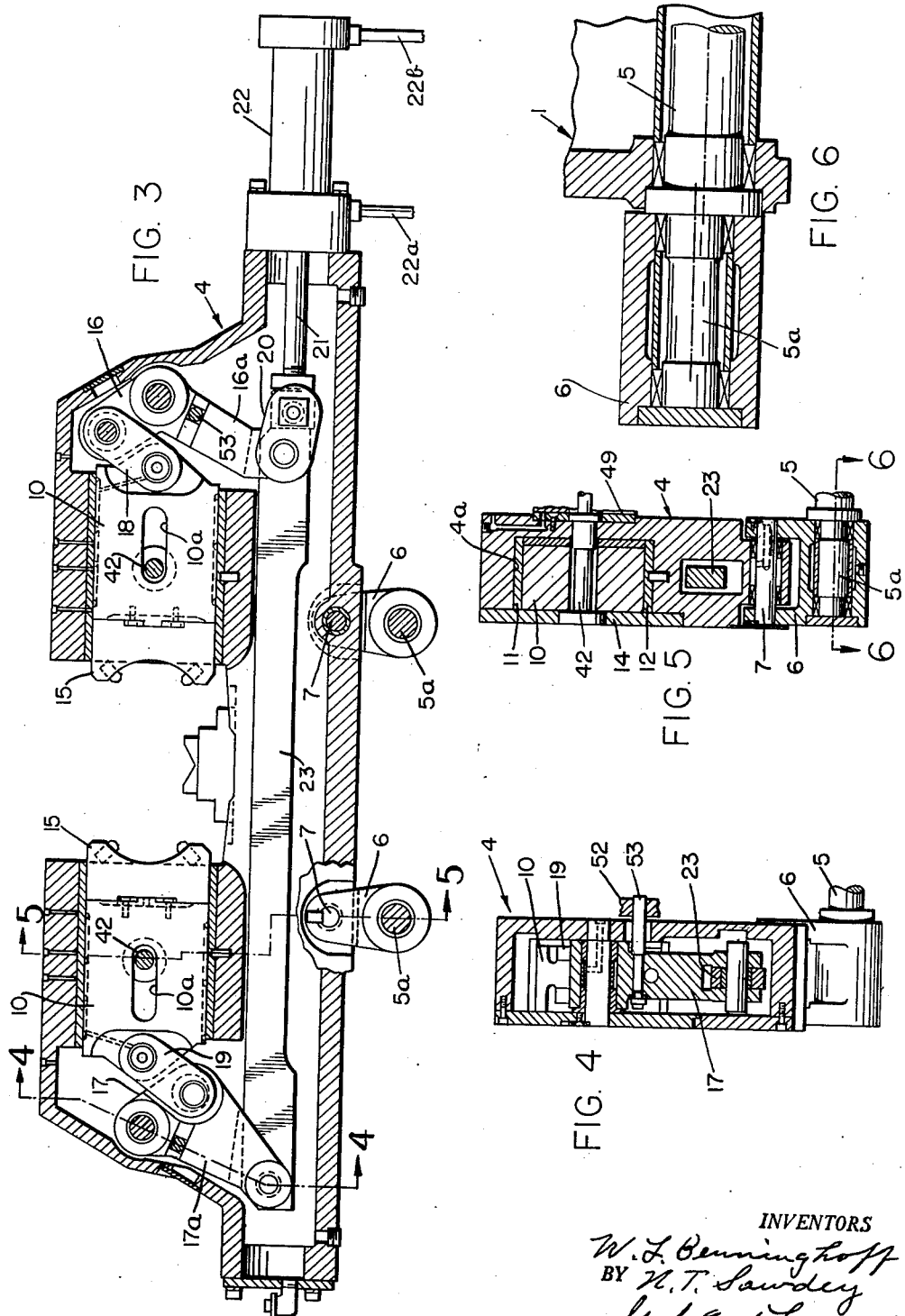

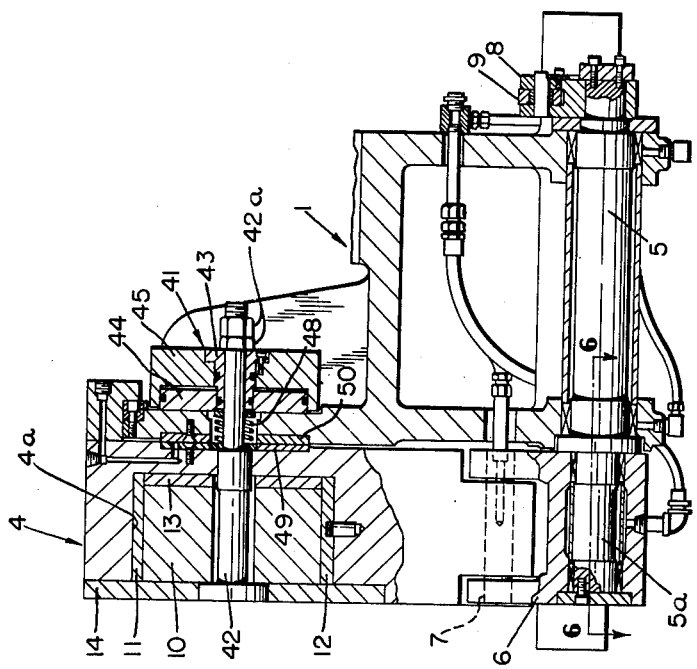
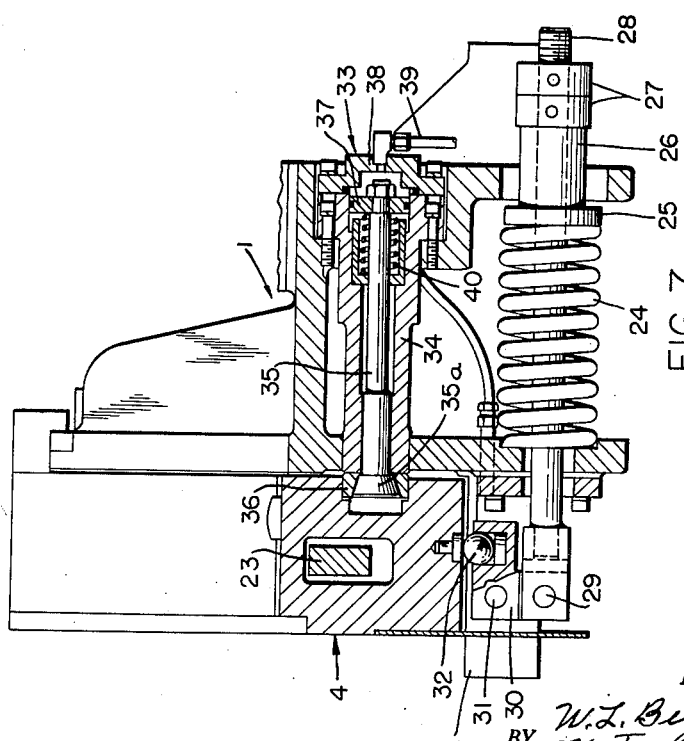

Patent 2,798,234

FLOATING CHUCK

William L. Benninghoff, Willoughby, and Neil T. Sawdey, Shaker Heights, Ohio, assignors to The Pipe Machinery Company, Wickliffe, Ohio, a corporation of Ohio Application January 3, 1955, Serial No. 479,502

7 Claims. (Cl. 10—107)

This invention relates to work holding chucks and particularly to chucks of the floating type suitable for use in machines for operating upon the ends of pipes.

In machines for forming taper cuts on the ends of pipes preparatory to threading the pipe ends and in machines for cutting such threads difficulties arise from the fact that pipes are not always straight. Thus when a pipe is bent adjacent its end to be threaded a non-floating type of chuck will hold the projecting end of the pipe to be operated on in a position eccentric to the axis of the cutter head of the threading machine and this results in a thread which is not of full length on one side of the pipe. It is accordingly the general object of the present invention to provide a floating chuck of improved design particularly adapted for use in modern thread-forming machines including machines of the fully automatic type such as is exemplified in U. S. patent to Sawdey, No. 2,679,057 and which machines are adapted for use in coordination with work handling apparatus of the automatic type such as is exemplified in the U. S. patent to Thompson et al., No. 2,690,572.

Another object of the invention is the provision of a floating chuck having a relatively simple and compact construction well adapted for mounting in the space available in threading machines of the class referred to and which at the same time is readily accessible for adjustment and repairs.

A further object of the invention is to provide a floating chuck of the compact design referred to in which the workpiece can be lowered from above between the gripping jaws of the chuck, thus permitting the use of pipe handling apparatus of the character shown in the above-noted Patent No. 2,690,572.

Another object of the invention is to provide a floating chuck having improved means for locking the floating structure of the chuck, including the work gripping jaws in a position eccentric to the axis of a machine cutter head in connection with which the chuck is used.

A further object of the invention is to provide a floating chuck having locking means such as last described and also means for centering the floating structure of the chuck with respect to the fixed support for the floating structure.

Still another object of the invention is to provide a chuck of the character specified having power actuating means especially adapted for operation in timed relation to other parts of a threading machine and of work holding apparatus when the threading machine is combined with such apparatus.

For the attainment of the above stated objects and others ancillary or incidental thereto, the invention consists in certain forms, arrangements and combinations of parts which are hereinafter described and claimed with reference to a preferred embodiment of the invention shown in the accompanying drawings.

In the drawings,

Fig. 1 is a plan view of the improved chuck.

Fig. 2 is a front elevation of the chuck.

Fig. 3 is a longitudinal vertical section on the line 3—3 of Fig. 1.

Fig. 4 is a section on the line 4—4 of Fig. 3.

Fig. 5 is a section on the line 5—5 of Fig. 3.

Fig. 6 is an enlarged fragmentary horizontal section on the line 6—6 of Fig. 5.

Fig. 7 is a vertical section on the line 7—7 of Fig. 1.

Fig. 8 is a section on the line 8—8 of Fig. 2.

Referring in detail to the apparatus illustrated, 1 generally designates a fixed chuck frame which is formed with downwardly opening channels 1a, 1b, which are designed to rest upon removable wear strips A and B which are detachably secured on the side rails C, C, of a threading machine bed frame, the wear strip B being formed in two parts to provide for transverse adjustment to take up wear. Hold-down plates 2, 3, bolted to frame 1, are designed to engage the wear strips A, B, and prevent vertical displacement of the fixed frame 1, at the same time permitting adjustment of the fixed frame on the bed frame of the threading machine as disclosed in the above-identified Patent No. 2,679,057.

The numeral 4 generally designates a movable or floating frame of the chuck, said frame being elongated and disposed to the rear of and closely adjacent to the fixed frame 1. Movable frame 4 is supported from the fixed frame by two shafts 5, 5 and links 6, 6. Each of the shafts 5, which have bearing supports in fixed frame 1, is formed at one end with an eccentric extension 5a (Fig. 6) on which the lower end of link 6 is rotatably mounted, while the link at its upper end engages a pivot pin 7 which is mounted in bearings in the lower side of movable frame 4 (Figs. 5, 8). The other end of each shaft 5 is keyed to an upstanding crank arm 8 and the upper ends of these crank arms are operatively connected by link 9 (Fig. 2), so that the eccentric extensions 5a of the shafts are maintained in the same angular relation to the shaft axes and simultaneous rotation of the shafts, by raising or lowering their extensions 5a relative to fixed frame 1, will insure equal raising or lowering of the two ends of the floating frame in response to any external upward or downward force applied to the said frame. In addition to the vertical movement of the floating frame thus provided for, rotation of the links 6 on the eccentric shaft extension 5a provides for horizontal movements of the floating frame. The vertical and horizontal movements described, when combined, provide for limited universal movements of frame 4 in a vertical plane while maintaining the horizontal disposition of the frame.

In its upper part the movable frame 4 is formed with rearwardly opening recesses or channels 4a to receive the chuck slides 10, 10 (Figs. 3, 8), wear plates 11, 12 and 13 being interposed between each slide 10 and the recess walls of the floating frame. A plate 14 secures each slide 10 against rearward displacement. The slides 10, 10 are fitted with removable interchangeable gripper jaws 15, 15 which may vary as to their gripping surfaces to handle pipes of different sizes.

For the actuation of the slides 10 toggle levers 16, 17 are mounted in frame 4 at the outer ends of the slides, and these toggle levers are connected by links 18, 19, respectively, to the slides. Toggle lever 16 has a downwardly extending arm 16a which is connected by a link 20 to the piston rod 21 of fluid pressure motor 22 which is fitted with conduits 22a and 22b for inlet and exhaust of pressure fluid. Correspondingly toggle lever 17 is formed with downwardly extending arm 17a which is connected by long link 23 with the lower end of lever arm 16a. The formations and relative arrangements of the two toggle levers 16 and 17 is such that movement of lever 16 by motor 22 effects equal and opposite movements of the slides 10, 10.

The weight of the floating frame 4 and of the end of the pipe gripped by the chuck jaws is counterbalanced by the horizontally disposed coil spring 24, one end of which engages a wall of the fixed frame 1. The other end of the spring is provided with an adjustable abutment consisting of ring 25, sleeve 26 and adjustable nuts 27 mounted on a tension rod 28 extending axially through the spring, the rod being connected by pivot pin 29 with one arm of right angle lever 30 which is pivotally supported on a pin 31 carried by arm extensions 1c of fixed frame 1 (Fig. 7). The horizontal arm of lever 30 is formed with a socket to receive a rotatable hardened steel ball 32 which engages hardened inserts in the lever and the under side of the movable frame 4 so that upward pressure on the latter is exerted by the spring 24. By adjustment of the nuts 27 the tension of the spring 24 can be varied according to the size and weight of pipes being handled by the chuck. Thus the spring, when suitably adjusted, is adapted to counterbalance the loaded floating structure of the chuck with its jaw axis within a limited range of movement in a plane at right angles to the axis of a machine cutter head with which the chuck cooperates, the extent of such movement relative to the cutter head axis being determined by the form and dimensions of the eccentric and link suspension means. Fig. 3 and Fig. 6 represent the eccentric and link connections between the fixed and floating chuck frames when the floating frame is counterbalanced with the jaw axis of the chuck centered in relation to its range of floating movement; and it will be noted that the links 6 are in a substantially vertical position and the eccentric shaft extensions 5a are in substantially the same plane as the main parts of shafts 5, although, as will later be noted, these preferred positions of the links and eccentrics are not essential to afford the floating chuck frame its required freedom of movement.

Centering means generally designated by the numeral 33 (Fig. 7) are provided to bring the axis of the chuck into alignment with the axis of the cutter head of a threading machine upon which the chuck may be mounted in the manner previously described. The centering means comprises a sleeve 34 which is fixedly secured by bolts in the frame 1. Slidably mounted in the sleeve is a centering pin 35 having at its rear end a forwardly tapering head 35a formed to engage a hardened ring 36 supported in the adjacent side of the floating frame 4. The front end of pin 35 is fitted with a piston disc 37 which slidably engages the bore of sleeve 34 at the front end thereof. A recessed plate 38 which is attached to the front end of the sleeve 34 provides a pressure chamber into which pressure fluid may be admitted through a conduit 39 to force the pin 35 rearward. In the absence of fluid pressure against piston 37 a coil spring 40 surrounding pin 35 maintains the taper head 35a of the pin in engagement with ring 36 to center frame 4 in relation to the fixed frame 1 and to the axis of the cutter head in connection with which the chuck is used. When it is desired to free the frame 4 for limited floating movement fluid pressure admitted against piston 37 compresses spring 40 and disengages the centering pin from the ring 36 to permit such floating action.

In addition to the centering means which has just been described the chuck is provided with two devices for rigidly clamping the floating frame in any desired working position eccentric to the axis of a threading machine cutter head. The clamping devices are generally designated by reference numerals 41, 41 (Figs. 1, 2, 8). Each of the clamping devices comprises a horizontally disposed headed bolt 42 which extends loosely through slot 10a of the adjacent chuck slide 10 with the bolt head engaging the front face of the slide (Fig. 8).

It will be noted that the head of the bolt 42 and an enlarged middle section thereof slidably engage the floating frame structure of the chuck. On the front reduced section of bolt 42 is mounted a flanged sleeve 43 which is secured on the bolt by abutment nuts 42a. Slidably mounted on sleeve 43 are a piston disc 44 and a flanged plate 45 formed to receive the piston disc 44, the parts 43, 44, and 45 having suitable packings to provide a fluid tight pressure chamber between piston disc 44 and plate 45. Fluid pressure is supplied to the chamber between parts 44 and 45 by a flexible conduit 46 which in turn is fed by fluid pressure supply pipe 47, the latter supplying both of the clamping devices, as indicated in Figs. 1 and 2. A coil spring 48 surrounding bolt 42 and interposed between floating frame 4 and the piston disc 44 serves to release frictional engagement between the floating frame 4 and fixed frame 1 when the clamping device is not subject to fluid pressure. The adjacent upright wall structures of the movable frame 4 and the fixed frame 1 are fitted with mutually engaging hardened wear plates 49 and 50, respectively.

It will be observed that a substantial clearance is provided between the reduced front portion of the clamping bolt 42 and the adjacent upright wall of the fixed frame 1 so that the clamping bolt and the parts 43, 44, 45 mounted thereon can have a limited movement with the floating frame relative to the fixed frame.

It will also be apparent that when fluid pressure is admitted between piston disc 44 and flanged plate 45 the piston disc is pressed against the adjacent surface of frame 1 while plate 45 applies forward tension to the clamping bolt 42 and thereby clamps the slide 10 of the chuck to the adjacent upright wall of the frame 4 and at the same time clamps the latter to the fixed frame 1. Thus not only the floating frame 4 but the slides 10 of the chuck are themselves rigidly fixed in position in relation to the fixed frame.

It will be seen that the construction of the improved chuck is adapted for hydraulic operation in case of the movement of the gripper jaws, of the centering mechanism and of the clamping devices. Such hydraulic operation under automatic control is known in the machining of pipes, as is exemplified in Patent No. 2,690,572, previously referred to. In such automatic systems the hydraulic motor devices may be controlled by solenoid valves which, in turn, are energized by the mechanical closing and opening of electric switches. In the case of the present chuck such switch control is exemplified by switches 51 actuated by cams 52 which are mounted on projecting pins 53 carried by the toggle levers 16, 17, one of the two switches being actuated at the end of the opening movement of the chuck jaws while the other is actuated at the end of the closing movement thereof.

In the drawings means are disclosed for conducting lubricant to various engaging surfaces, but these lubricating means constitute no part of the present improvements and therefor have not been described.

It is believed that the operation of the chuck may be understood from the foregoing description but to insure clarity a typical operation may be briefly summarized. It will be assumed that the chuck is mounted on the bed frame of a threading machine, such, for example, as that of Patent No. 2,679,057 arranged for operation in conjunction with pipe handling apparatus, as in the case of Patent No. 2,690,572, with the chuck open after releasing a previously threaded pipe, at which time fluid pressure is released from the centering means 33 permitting engagement of the centering device by the coil spring 40. Upon lowering the next pipe to be threaded between the chuck jaws a valve controlling the conduit 22a is opened and motor 22 is energized to close the chuck jaws. This closing movement may actuate one of the switches 51 to admit fluid pressure to the centering means 33 thus releasing the movable frame of the chuck for floating movement. Then, in case of lateral misalignment of the pipe end with the cutter head, the engagement of the pipe by the cutters will effect a centering of the pipe end with the cutter head in known manner. Such centering movement, in any direction in a plane at right angles to the chuck axis, is permitted by the link and eccentric connections between the main and floating chuck frames, swinging movement of the links about their respective eccentrics contributing chiefly any needed horizontal component of the centering movement and upward or downward movement of the eccentrics around their shaft axes contributing chiefly any needed vertical component of the centering movement. After a small portion of the thread cutting operation is completed a suitably arranged switch is actuated to energize a valve controlling admission of pressure fluid through pipe 47 and flexible conduits 46, 46 to tightly engage the clamp devices 41. Thus for the remaining portion of the threading operation the pipe end is held in rigid alignment with the cutter head of the threading machine. At the end of the threading operation the chasers of the cutter head are collapsed and the cutter head retracted from the pipe. The retraction of the cutter head will serve through suitable controls to automatically release the fluid pressure in both the centering means 33 and the clamping devices 41 thus permitting the centering of the floating chuck frame 4 by the spring 40 of the centering means and leaving the chuck ready to receive the next pipe to be threaded. By thus centering the floating chuck frame for each threading operation the floating movement necessary to be effected by engagement of the threading cutters with the pipe end in order to align the pipe with the cutters is reduced substantially in amount.

It will be seen that although the improved chuck has sufficient floating movement to assure proper alignment of the pipe end with a cutter head if the crookedness of the pipe is within passable bounds, nevertheless when once the cutting operation has been initiated the clamp devices hold the pipe rigidly in position even more effectively than a non-floating type of chuck in which the chuck slides are not rigidly clamped to a fixed frame. Thus highly accurate thread formation is assured in addition to the advantages of the floating type of construction. Furthermore, while the improved construction includes all of the means necessary to perform the required gripping, clamping and centering operations the structure is remarkably compact. At the same time all parts are readily accessible for inspection, adjustment and replacement.

While the construction which has been illustrated and described is such as is preferred, it is to be understood that the forms of construction specifically disclosed can be varied extensively without departure from the invention as defined in the appended claims. For example, while the link and eccentric connection between the fixed and movable frames of the chuck are preferably formed and disposed as shown and described, the normal positions of links 6 may depart from the vertical and the eccentrics may normally be above or below the level of their shafts, provided that the combined swinging movements of the links and eccentrics will afford the needed horizontal and vertical components of the centering movement. The angular arrangement of the links and eccentrics shown is preferred because it provides needed components of movement with minimum movements of the links and eccentrics and with a maximum ease of motion. Also the construction shown has the practical merit of compactness.

What is claimed is:

1. A work-gripping chuck comprising a fixed frame; a movable frame; gripping jaws movably supported on the movable frame; means for operatively supporting the movable frame on the fixed frame comprising a pair of parallel laterally separated rotatable shafts each of which has a bearing support on the fixed frame and comprises a cylindrical part eccentric to the axis of its bearing support, connecting means between the shafts operable when the shafts turn to maintain their eccentric parts in the same angular relation to the axes of their bearing supports, a pair of links each having one of its ends rotatably mounted on the eccentric part of one of the rotatable shafts and its other end pivotally connected to the movable frame, the links being parallel to each other and normally disposed at a substantially different angle to the fixed frame than are the eccentric parts of the shafts, and means interposed between the fixed and movable frames for counter-balancing the work-loaded movable frame; and means for locking the movable frame against movement relative to the fixed frame.

2. The chuck of claim 1 having the axes of the eccentric parts of the shafts normally horizontally displaced from the bearing axes of the shafts and having the links normally extending upward from their supporting shafts.

3. The chuck of claim 1 having the means for locking the movable frame against movement relative to the fixed frame operable also to lock the gripping jaws rigidly against movement relative to the two frames.

4. The chuck of claim 1 in which the means for counterbalancing the work-loaded movable frame is arranged to apply the counterbalancing force to the said frame at a point between its connections with the two supporting shafts mounted in the fixed frame.

5. A work-gripping chuck comprising a fixed frame; a movable frame disposed beside the fixed frame; means interposed between the two frames for supporting the movable frame from the fixed frame for horizontal and vertical movements; a pair of opposed jaws slidably supported in the movable frame; means for moving the jaws toward and away from each other to grip and release a work-piece; and means for locking the movable frame and the gripping jaws against movement relative to the fixed frame, the said means comprising a pair of clamping devices each of which comprises a tension clamping bolt having its head engaging one side of a gripper jaw and its stem extending transversely through said jaw and the mutually adjacent side walls of the movable and fixed frames and means for establishing tension in the bolt to clamp the said jaw and walls in fixed relation to each other.

6. The chuck of claim 5 in which the means for establishing tension in the clamping bolts comprises fluid pressure motor means.

7. The chuck of claim 5 in which the means for establishing tension in the clamping bolts comprises for each bolt an abutment thereon, fluid pressure means interposed between the abutment and the fixed frame comprising centrally apertured cooperating cylinder and piston elements pierced by the bolt and means for admitting pressure fluid between the said elements.

References Cited in the file of this patent
UNITED STATES PATENTS

| | | |
|---|---|---|
| 941,543 | Sistek | Nov. 30, 1909 |
| 1,317,049 | Smith | Sept. 23, 1919 |
| 2,067,626 | Benninghoff | Jan. 12, 1937 |
| 2,112,240 | Hibbard | Mar. 29, 1938 |
| 2,184,136 | Benninghoff | Dec. 19, 1939 |
| 2,341,602 | Dewey | Feb. 15, 1944 |